United States Patent                                                                  [11] 3,597,829

| [72] | Inventors | Otto C. Wagner<br>Long Branch;<br>Martin J. Sulkes, Freehold, both of, N.J. |
|---|---|---|
| [21] | Appl. No. | 808,353 |
| [22] | Filed | Mar. 18, 1969 |
| [45] | Patented | Aug. 10, 1971 |
| [73] | Assignee | The United States of America as represented by the Secretary of the Army |

[54] METHOD OF MAKING A NICKEL HYDROXIDE ELECTRODE
4 Claims, No Drawings

[52] U.S. Cl. ........................................... 29/420.5,
29/25, 136/29, 136/24, 75/20 F, 136/67
[51] Int. Cl. ............................................. B22f 3/24
[50] Field of Search ................................. 29/25,
420.5; 136/29, 24, 67, 75; 75/20 F; 139/24, 29, 67

[56] References Cited
UNITED STATES PATENTS

| 2,895,819 | 7/1959 | Fiedler | 75/20 |
| 3,009,979 | 11/1961 | Corren | 136/29 |
| 3,024,296 | 3/1962 | Adler | 136/24 |
| 3,184,339 | 5/1965 | Ellis | 136/75 |
| 3,393,096 | 7/1968 | Jost | 136/29 |
| 3,436,267 | 4/1969 | Faber | 136/29 |

*Primary Examiner*—John F. Campbell
*Assistant Examiner*—Donald P. Rooney
*Attorneys*—Harry M. Saragovitz, Edward J. Kelly, Herbert Berl and Roy E. Gordon ABSTRACT: A nickel hydroxide electrode suitable for use in an alkaline nickel battery is made by pasting a solvent dispersion of nickel hydroxide onto a nickel foam matrix, drying the pasted matrix, pressing the dried pasted matrix to the required size, and attaching an electrically conductive tab to the electrode.

METHOD OF MAKING A NICKEL HYDROXIDE ELECTRODE

The invention described herein may be manufactured, used, and licensed by or for the Government for governmental purposes without the payment to us of any royalty thereon.

This invention relates to a simple, direct, and inexpensive method of making a nickel hydroxide electrode.

BACKGROUND OF THE INVENTION

A major shortcoming of conventional high rate sintered-nickel nickel hydroxide electrodes used in nickel-cadmium batteries is that the fabrication processes involve many elaborate and expensive steps which are costly in machining, investment, and labor. Such expensive steps include sintered plaque processing, multistep impregnations in nickel nitrate baths, hot caustic polarizations, washing, and drying and characterization formation cycling. An alternative method employed in the battery industry for making inexpensive nickel electrodes is by mold pressing nickel hydroxide containing carbon or nickel conductor (with or without binder) with conducting grid. A major limitation of the mold pressed electrode is that its electrical conductivity is poor and the active material utilization drops off with increasing current densities.

SUMMARY OF THE INVENTION

The general object of this invention is to provide a simple, direct, and inexpensive method of making a nickel hydroxide electrode suitable for use in alkaline nickel batteries such as nickel-cadmium, nickel-zinc, and nickel-iron. A further object of this invention is to provide such a method wherein the resulting nickel hydroxide electrode will be characterized by excellent electrical conductivity.

It has now been found that the aforementioned objects can be attained by pasting a solvent mixture of nickel hydroxide into an expanded conductive nickel foam. Particularly, the method of the invention includes the steps of: (1) mixing nickel hydroxide and conductive carbon with a low boiling solvent to obtain a thin paste, (2) spreading the paste onto a nickel foam matrix, (3) drying the pasted matrix at a temperature above the boiling temperature of the solvent, (4) pressing the dried pasted matrix to electrode size, and (5) attaching the usual tab to the electrode.

DETAILED DESCRIPTION OF THE PREFERRED EMBODIMENT

As an example of the preparation of the nickel hydroxide electrode, 0.93 grams of nickel hydroxide and 20 percent conductive carbon is mixed with 0.5 to 1.0 cc. of toluene to obtain a dispersion of thin paste consistency. The paste is then spread by doctor blade onto a nickel foam matrix of 98 percent porosity and 100 mil thickness. The nickel foam matrix is about 1 inch in length and 1 inch in width and is spongelike in character being comprised of a highly porous nickel structure (95 to 98 percent porous). The pasted matrix is then dried at about 80° to about 120° C. The dried pasted matrix is then pressed to size under a pressure of about one-half ton to 2 tons per square inch so that the porosity of the finished electrode is about 40 to 60 percent. An electrically conductive tab is then spotwelded to a corner of the electrode.

The electrode was then tested in a single-electrode nickel-cadmium cell at an apparent current density of 100 milliamperes per square inch to 0.9-volt cutoff. Charging was at the 10-hour rate for 150 percent input. Test results indicate that the nickel hydroxide electrode prepared by the invention method would only require 4.6 grams of active nickel hydroxide to obtain 1 ampere hour of capacity whereas the standard mold pressed nickel hydroxide electrode requires 6.4 grams of active nickel hydroxide for the same capacity. Another advantageous result indicated by the test is that the average closed circuit potential of the electrode prepared by this invention was 1.16 volts as contrasted with 1.06 volts for the standard mold pressed nickel hydroxide electrode.

Thus the method of the invention provides for the manufacture of a nickel hydroxide electrode which is significantly better in electrical performance than the standard mold pressed nickel hydroxide electrode.

The economic nickel hydroxide electrode prepared by the method of this invention also compares favorably in electrical performance to the rather expensively made sintered nickel hydroxide electrode. The cost savings reflected in reduced labor and processing steps should be at least 30 percent.

In the method of the invention, the particular solvent used, drying temperatures employed, pressures employed, amounts of active ingredients used, amount of conductive carbon used, etc. is not to be considered critical as modifications thereof would readily occur to one skilled in the art.

We wish it to be understood that we do not desire to be limited to the exact details of construction shown and described, for obvious modifications will occur to a person skilled in the art.

What we claim is:

1. A method of making a nickel hydroxide electrode including the steps of:
    1. mixing nickel hydroxide with a low boiling solvent to obtain a thin paste,
    2. spreading the paste onto a nickel foam matrix,
    3. drying the pasted matrix at a temperature above the boiling temperature of the solvent,
    4. pressing the dried pasted matrix to electrode size, and
    5. attaching an electrically conductive tab to the electrode.

2. A method to claim 1 wherein conductive carbon is mixed with the nickel hydroxide.

3. A method according to claim 1 wherein toluene is the solvent.

4. A method of making a nickel hydroxide electrode including the steps of:
    1. mixing about 1 gram of nickel hydroxide and 20 percent conductive carbon with about 1 cc. of toluene to obtain a thin paste,
    2. spreading the paste onto a nickel foam matrix,
    3. drying the pasted matrix at about 80° to about 120° C.,
    4. pressing the dried pasted matrix under a pressure of about one-half ton to about 2 tons per square inch so that the porosity of the finished electrode is about 40 to 60 percent, and
    5. attaching an electrically conductive tab to the compressed upper corner of the electrode.